US005340282A

United States Patent [19]
Milocco

[11] Patent Number: 5,340,282
[45] Date of Patent: Aug. 23, 1994

[54] DRIVE SYSTEM FOR A WATER PUMP WITH ROTATABLE SEALING ARRANGEMENT

[75] Inventor: Claudio Milocco, Pordenone, Italy

[73] Assignee: Zanussi Elettrodomestici S.p.A., Italy

[21] Appl. No.: 800,603

[22] Filed: Nov. 27, 1991

[30] Foreign Application Priority Data

Dec. 5, 1990 [IT] Italy ................. 45775/A90

[51] Int. Cl.$^5$ ............................ F04D 15/00
[52] U.S. Cl. ........................... 417/18; 417/22; 417/44 J; 318/127
[58] Field of Search ............ 417/18, 22, 44 J; 318/119, 126, 127, 128, 129

[56] References Cited

U.S. PATENT DOCUMENTS 3,918,479 11/1975 Perl ........................... 417/367
4,885,487 12/1989 Ksovreli et al. ............. 318/119

FOREIGN PATENT DOCUMENTS 1417159 8/1988 U.S.S.R. ...................... 318/126

*Primary Examiner*—Richard A. Bertsch
*Assistant Examiner*—David W. Scheuermann
*Attorney, Agent, or Firm*—Pearne, Gordon, McCoy & Granger

[57] ABSTRACT

Drive system for a water pump unit (7, 8) driven by the shaft of a reversible motor (4) through a partition wall, about said shaft (5) being mounted a first sealing ring (14) fixed to said wall (13), and a second sealing ring (15) rotatably driven by the shaft and forming a rotatable water-tight sealing arrangement (6) with the first ring (14). The system includes control device (19, 22) capable of normally actuating the motor according to a preset program, and devices (19, 20, 26) to make the motor temporarily oscillate at a predetermined frequency (f), with a sequence of rotations in alternate directions, in case the two sealing rings (14, 15) are sticked together. The oscillation of the rotatable unit associated with the rotor (5) causes the two sealing rings to mutually separate.

7 Claims, 1 Drawing Sheet

DRIVE SYSTEM FOR A WATER PUMP WITH ROTATABLE SEALING ARRANGEMENT

BACKGROUND OF THE INVENTION

The present invention relates to a drive system for at least a water pump driven by a reversible electric motor with the interposition of a rotatable sealing arrangement.

It is common practice, for example in dishwashing machines, to use at least one water pump driven by a reversible motor, preferably an asynchronous motor, whose drive shaft sealingly extends across the casing of the pump. In dishwashing machines, in particular, the water seal is usually formed by a ceramic ring which is, fixed on a partition wall between the pump and the motor, and a graphite ring which cooperates with the ceramic ring and is rotated by the drive shaft. More particularly, the graphite ring is mounted about the drive shaft on the side of the partition wall communicating with the pump, and is connected to the shaft through resilient biasing means which usually include a pressure spring and a shaped rubber ring, or the like. The pressure spring surrounds the rubber ring, that in turn is keyed about the drive shaft, and keeps the graphite ring axially pressed against the ceramic ring, and to which the rotational movement of the drive shaft is discharged due to the friction exerted by an embossed edge of the rubber ring which is interposed between the spring and the graphite ring. Basically, the rotatable water-tight seal is formed between the slidingly cooperating surfaces of the ceramic ring and the graphite ring, which to this aim are made with a high degree of finishing.

However, it is known that the two ceramic and graphite rings may easily "stick" together (that is, a high starting friction may occur between the mutually cooperating surfaces), sometimes to such an extent as to prevent rotation of the asynchronous motor, which can be damaged by overheating.

Such sticking may easily occur, mainly in a dishwasher, due to the following reasons:
 deposit of dirt and/or limestone particles on the sealing rings;
 scaling of the sealing rings, caused by salt used for regeneration of the water softener;
 drying-up of the sealing rings after prolonged inoperative periods of the machine and;
 excessive axial pressure exerted by the spring.

Arrangements are known, as disclosed for instance in DE-B-1061425, to increase the starting torque of an electric motor. However, these arrangements relate to the use of a synchronous motor to rotationally drive a reduced load. More particularly, in order to compensate for the low starting torque of the synchronous motor, the driven shaft is coupled with the driving shaft by means of a transmission system which enables the driving shaft to idle by an angle which is smaller than 360°.

These prior art arrangements are, of course, substantially ineffective. For example when, as in the above-mentioned case, they are used in a dishwashing machine, wherein a remarkable starting torque may be required to enable the pump to start up correctly when sticking occurs in the rotatable sealing arrangement.

SUMMARY OF THE INVENTION

Thus, it is a general object of this invention to provide a drive system for a water pump associated with a rotatable sealing arrangement, the drive system being capable of substantially ensuring correct starting of the pump even if the sealing arrangement is subject to sticking.

More particularly, it is an object of this invention to provide a drive system of the type mentioned above through which a reversible asynchronous drive motor can drive the impeller of the pump, overcoming any possible high starting friction occurring in correspondence of the rotatable sealing arrangement.

According to the invention, these scopes are attained in a drive system for a water pump embodying the features of the appended claims.

BRIEF DESCRIPTION OF THE DRAWINGS

The characteristics and advantages of the invention shall become more apparent from the following description, given solely as a non-limiting example, with reference to the accompanying drawings, wherein.

DETAILED DESCRIPTION OF THE PREFERRED EMBODIMENT

Figure 1:
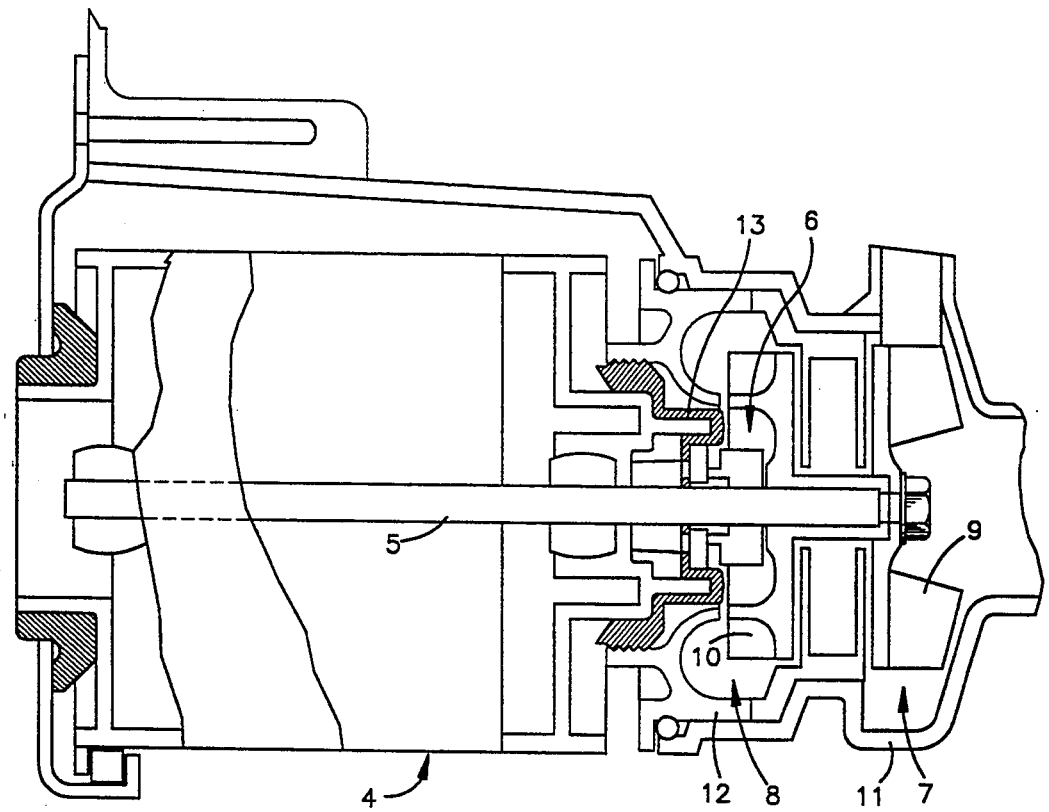
FIG. 1 diagrammatically shows a partial longitudinal section of a motor-operated pump unit forming part of the drive system according to this invention.
Figures 2, 3:
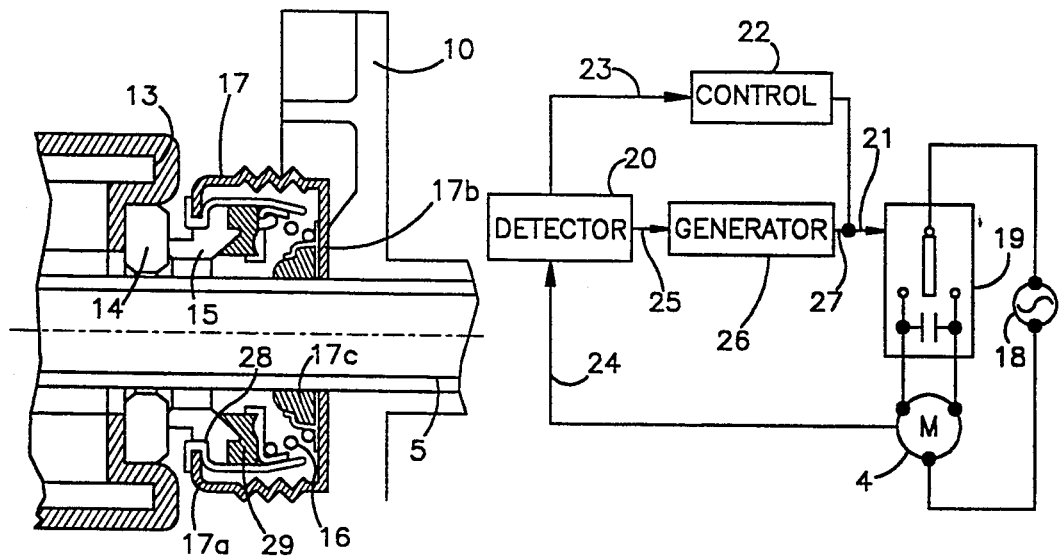
FIG. 2 shows an enlarged portion of the pump unit as in FIG. 1, according to a preferred embodiment of the invention.
FIG. 3 shows a block-diagram of a preferred embodiment of the drive system according to the invention.

The embodiment illustrated as an example in FIGS. 1 and 2 relates to an automatic dishwashing machine provided with a pump unit of the kind disclosed in U.S. Pat. No. 4,799,855. In particular, the dishwashing machine includes a reversible asynchronous motor 4 whose driving shaft 5 is connected with a centrifugal circulating pump 7 and a peripheral outflow drain pump 8 through a watertight sealing arrangement 6. As an alternative, of course, the shaft 5 may drive only one of the pumps 7, 8, as the case may be.

The pumps 7 and 8 are arranged in a known way to respectively supply a wash-water circuit and a water drain circuit (not shown) of the dishwashing machine and are alternately operated when the driving shaft 5 rotates in a first or a second direction, respectively. The impellers 9 and 10 of the two pumps are keyed on the driving shaft 5 and are housed in relevant chambers 11 and 12 which are separated from the motor 4 by at least one partition wall, generally illustrated at 13 in FIGS. 1 and 2, in correspondence of which the sealing arrangement 6 is provided.

More particularly as shown in FIG. 2, the sealing arrangement 6 comprises a ceramic ring 14, or the like, which is fixed onto the partition wall 13 and in which the shaft 5 extends in a freely rotatable way. The sealing arrangement further comprises, on the side of the partition wall 13 communicating with the pump unit, a graphite ring 15, or the like, which is freely mounted about the shaft 5 and coaxial with a pressure spring, preferably a garter spring, 16. An end portion of the spring 16 is rotatably integral with the graphite ring 15, whereas the opposite end portion of the spring is fixed to the driving shaft 5 through the impeller 10, for example. Hence, the spring 16 has the dual function of to resiliently trasmitting the rotational movement of the shaft 5 to the graphite ring 15 and keeping the graphite ring axially pushed against the ceramic ring 14. The two rings thus form a rotatable water-tight sealing arrangement.

Preferably, the sealing arrangement 6 also includes a thin bellows 17 made of rubber, or similar material, surrounding the pressure spring 16 and having an end portion 17a fitted to the periphery of the graphite ring 15. In this connection, the end portion 17a of the bellows is clamped into a corresponding groove provided in a support frame 28 which is mounted onto the periphery of the graphite ring 15 with the interposition of an elastic ring 29. The opposite end portion of the bellows 17 is formed with a substantially circular wall 17b which is sealingly mounted on the driving shaft 5, rotatably integral therewith, through an embossed portion 17c that may be provided with metal stiffening elements, which are in the art.

Thanks to the resiliency of the material, and the thinness of the walls, the bellows 17 is particularly flexible, to such an extent that it in practice does not provide any angular constraint for the graphite ring 15, at least within small angles (e.g., smaller than 10°). Thus, according to an aspect of the invention the ring 15 of the rotatable sealing arrangement is substantially connected with the driving shaft 5, for rotation therewith, only by means of the spring 16.

As is known, the mutually cooperating surfaces of the ceramic ring 14 and graphite ring 15 are arranged to relatively rotate with respect to one another with a friction coefficient which is negligible under normal operating conditions, but can have a remarkably high value under anomalous operating conditions, as already stated.

With reference to FIG. 3, the asynchronous motor 4 is connected to a power supply source 18 via an inverter 19 including, for instance, a phase-shift capacitor and a switch, preferably an electronic switch, which is normally in the open position, as is shown in FIG. 3. The inverter 19 has a control input 21 driven by a corresponding output of a timing control device 22 which is associated with the programmer (not shown) of the dishwashing machine. The timing control device 22 may, for instance, include a Motorola 6804 or 6805 microprocessor or, as an alternative, a Texas Instrument NE555 timing integrated circuit.

The programmer (and accordingly the control device 22) is arranged in a traditional manner to control operation of the main operative components of the dishwashing machine, which one not shown for the sake of simplicity. In particular, the control device 22 is capable of driving the input 21 of inverter 19 with a first control signal (e.g., a pulse signal) which, according to the pre-set program, causes the inverter 19 to repeatedly switch in a timed way for performing respective phases of rotation of the motor 4 in one and/or the opposite directions. As set forth above, in the present embodiment these phases of rotation in either direction correspond to washing phases and water drain phases, respectively, which are included in the general program of operation of the dishwashing machine.

The control device 22 is arranged to output the said first control signal when an enabling signal (e.g., a logic level "1") occurs at a drive input 23 thereof. The input 23 of the control device is connected with a corresponding output of a threshold stage 20 of the commutation type, the latter being also provided with a second output 25 and an input 24. Preferably, the threshold stage 20 includes a well known integrating current detector. More particularly, it may include a RC integrator arranged to drive a Philips HEF4013 Dual Flip-Flop through a Motorola LM393 double comparator. The input 24 of the threshold stage 20 is driven by the current absorbed by the motor 4, or in an alternative manner by a quantity which is proportional to that current. In a per se known manner, the threshold stage 20 is capable of alternately generating the enabling signal at either the first output 23 or the second output 25 when the monitored quantity at its input 24 is respectively lower or higher than a predetermined threshold value for a given time period T (a few seconds, for example). Bearing in mind the general dimensioning of the whole system, such a threshold value may readily be calculated by those skilled in the art to correspond to a value of the current absorbed by the motor 4 beyond which the motor is under anomalous, substantially locked-rotor conditions.

According to an aspect of the present invention, the output 25 of the threshold stage 20 is connected to a corresponding input of a generator device 26 having an output 27 connected with the control input 21 of the inverter 19. The generator device 26 is preferably in the form of a multivibrator, for instance including a Texas Instrument 4060 or 4098 integrated circuit, which, in response to the occurrence of said enabling signal at input 25, is adapted to generate at output 27 a second control signal lasting a predetermined time period T1>T of approx. 10 sec, for example. Furthermore, the multivibrator 26 is arranged to be reset in a known manner when the enabling signal at its input 25 ceases.

The second control signal may be in the form of a substantially square wave having a predetermined frequency f. Thus, when the inverter 19 is fed at input 21 with the control signal generated by multivibrator 26 it cyclically switches, at a frequency which is equal to the predetermined frequency f, to actuate motor 4 with alternating directions of rotation.

The operation of the drive system as in FIG. 3 will be hereafter described. When the motor 4 is to be started to perform a phase of actuation of either pump 7, 8 the control device 22 drives input 21 of inverter 19 with the first control signal, so that the motor is supplied by the inverter to rotate in a corresponding direction. Under normal operating conditions, that is, when no substantial sticking occurs between the two rings 14, 15 of the rotatable sealing arrangement, even a small starting torque of the asynchronous motor 4 is sufficient to bring into rotation the whole rotatable unit, including the rotor 5 of the motor, the impellers 9, 10 of the pumps, the sealing ring 15 with spring 16, and the bellows 17. In particular, motor 4 has a low current absorption, so the threshold stage 20 keeps generating at output 23 the enabling signal which enables the control device 22 to drive the inverter 19 in a traditional manner, as is determined by the programmer of the machine.

However, if the two rings 14, 15 of the rotatable sealing arrangement are substantially stuck together, the rotor 5 is substantially locked, therefore, the current absorbed by motor 4 has a value which is higher than the threshold value of stage 20. After the time period T, the threshold stage 20 generates said enabling signal at its output 25, instead of output 23. As a consequence, the control device 22 is turned off and the inverter 19 is driven by the control signal the multivibrator 26, so that during a time period T1 the motor 4 is cyclically operated with alternating directions of rotation, as stated previously which causes a torsional oscillation of the spring-biased rotatable unit associated with the driving shaft 5.

Due to the resilience of the spring 16, such an oscillation may occur by small angles (smaller than 10°) even if the sealing ring 15 is stuck together with the sealing ring 14 of the rotatable sealing arrangement. This is because the spring 16 transmits the torsional vibrations of the driving shaft 5 at the frequency f to the sealing ring 15, causes the two sealing rings 14, 15 of the rotatable sealing arrangement to mutually separate.

This ensures, that the driving shaft 5 is free to rotate again (in either direction) after the time period T1, so that the current absorption of motor 4 decreases to a value which is lower than the threshold value of stage 20. Accordingly, after a further time period T (which is negligible) the threshold stage 20 generates the enabling signal at output 23 again. The multivibrator 26 is then turned off and reset, while the control device 22 can control operation of motor 4 again, as determined by the programmer of the machine. The whole drive system is therefore advantageously self-controlled. That is to say, it can automatically intervene in case of any possible sticking occurring on the rotatable sealing arrangement 6, in order to restore correct operation thereof as soon as the anomalous conditions cease.

According to another aspect of the invention, in order to further improve the effectiveness of the drive system the frequency f of said torsional vibrations preferably has a value which is correlated to the main mechanical characteristics of the drive system, namely the modulus of elasticity E of the spring 16, the radius R and length L of the wire forming the spring, and the moment of inertia I of the rotatable unit. In practice, insofar as small angles of rotation are concerned, one can roughly assume that such a moment of inertia I is only determined by the mass of the rotor of motor 4, so it is a information which is readily available to a person skilled in the art.

More particularly, according to the invention frequency f preferably has a value adapted to bring substantially into resonance the rotatable (oscillating, in this phase) unit which is resiliently connected with the sealing ring 15 through the spring 16. It should be apparent that in this way even a motor 4 having a limited starting torque can transmit remarkable mechanical stresses to the ring 15, so as to effectively separate it from the fixed sealing ring 14.

It should be born kept in mind that, thanks to the fact that for small angles of rotation the graphite ring 15 is connected with the driving shaft 5 solely through the spring 16, any friction in correspondence of the rotatable unit is substantially negligible even when the rotatable sealing arrangement is under sticking conditions. Hence, the rotatable unit will be substantially under resonance conditions when the frequency f of the control signal generated by the multivibrator 26, as in FIG. 3 (and therefore the frequency of the afore-mentioned oscillations) has a value which can be expressed by the following simplified formula:

$$f \simeq [1/(\pi \cdot R^2)] \cdot \sqrt{L/(\pi \cdot I \cdot E)} .$$

It was experimentally proven that in a motor-pump system for dishwashers with standard general dimensioning the mutual separation of the two rings 14, 15 of the rotatable sealing arrangement is particularly effective, within a time period T1, when the frequency f of the vibrations has a relatively high value, ranging between 1 and 50 Hz. It should be apparent that a high frequency f causes the driving shaft 5 to oscillate by small angles.

Obviously, the drive system described above may undergo a number of modifications without departing from the scope of the invention. For instance, the sealing rings 14, 15 may be made of a different appropriate material, or the complementary water-tight seal consisting of the flexible bellows 17 may have a different structure.

Of course, even the electric motor 4 may be of a different type.

Anyway, the drive system according to the present invention may comprise one or more pumps, as stated before, which can be utilized in different appliances, as the case may be.

I claim:

1. A drive system for a water pump, said water pump being driven by a shaft of a reversible electric motor which extends through a partition wall, about said shaft being mounted a first sealing ring which is fixed to said wall and a second sealing ring capable of being rotated by the shaft and forming a rotatable water-tight sealing arrangement with the first ring, said motor being supplied through inverter means having a control input arranged to be driven by a first control signal to actuate said motor in a first or a second direction of rotation according to a preset program, said first control signal being generated by a control device when the latter receives an enabling signal, wherein said control input (21) of the inverter means (19) is further arranged to be driven by a second control signal having a predetermined frequency to cause said motor (4) to oscillate at said predetermined frequency with a sequence of rotations in alternate directions, said second control signal being generated by a generator device (26), for a given time period (T1), when said enabling signal is applied to the generator device, detector means (20) being provided to monitor a quantity which is proportional to the current absorbed by said motor (4) and to supply said enabling signal to either said control device (22) or said generator device (26) when said quantity is, respectively, lower or higher than a predetermined threshold value.

2. A drive system according to claim 1, wherein said second sealing ring is axially pressed against said first sealing ring by resilient biasing means mounted about said shaft, said second sealing ring (15) being arranged to be rotated by said shaft (5) by means of said resilient means (16), the latter having opposite end portions which are fixed to said second ring and said shaft, respectively.

3. A drive system according to claim 1, wherein said shaft forms part of a spring-biased rotatable unit, the mass of which is substantially determined by a rotor of said motor, the predetermined frequency of said second control signal having a value (f) so as to bring substantially into resonance said spring-biased rotatable unit.

4. A drive system according to claim 1, wherein said predetermined frequency has a value (f) between 1 and 50 Hz.

5. A drive system according to claim 1, wherein said predetermined frequency has a value (f) between 1 and 50 Hz.

6. A drive system according to claim 2, wherein said shaft forms part of a spring-biased rotatable unit, the mass of which is substantially determined by a rotor of said motor, the predetermined frequency of said second control signal having a value (f) so as to bring substantially into resonance said spring-biased rotatable unit.

7. A drive system according to claim 2, further comprising a flexible, water-tight sealing bellows (17) surrounding said resilient biasing means (16) and having a first end portion (17a) fitted to the periphery of said second ring (15), and a second end portion (17b, 17c) fixed to said shaft (5).

* * * * *

UNITED STATES PATENT AND TRADEMARK OFFICE
CERTIFICATE OF CORRECTION

PATENT NO. : 5,340,282    Page 1 of 2

DATED : August 23, 1994

INVENTOR(S) : Milocco

It is certified that error appears in the above-identified patent and that said Letters Patent is hereby corrected as shown below:

```
On the title page:          in the abstract, line 7, after
"includes" insert --a--.

Column 1, line 50, delete "and;" and insert --; and--.

Column 2, line 68, delete "to".

Column 3, line 12, after "a" insert --annular--; and
         line 19, after "are" insert --known--.

Column 4, line 3, delete "a" and insert --an--;
         line 41, after "as" insert --shown--;
         line 61, delete ", therefore" and insert --.
         Therefore--; and
         line 67, after "signal" insert --from--.
```

UNITED STATES PATENT AND TRADEMARK OFFICE
CERTIFICATE OF CORRECTION

PATENT NO. : 5,340,282
DATED : August 23, 1994
INVENTOR(S) : Milocco

It is certified that error appears in the above-indentified patent and that said Letters Patent is hereby corrected as shown below:

```
Column 5, line 11, delete "causes" and insert --causing --.
         line 13, after "ensures," insert --therefore, --.
         line 39, delete 'a' (first occurrence ); and
         line 50, delete "born".
```

Signed and Sealed this

Tenth Day of January, 1995

Attest:

*Attesting Officer*

BRUCE LEHMAN

*Commissioner of Patents and Trademarks*